F. B. SMITH.
INTERLOCKING FRICTION CLUTCH.
APPLICATION FILED OCT. 26, 1906.
920,203.
Patented May 4, 1909.
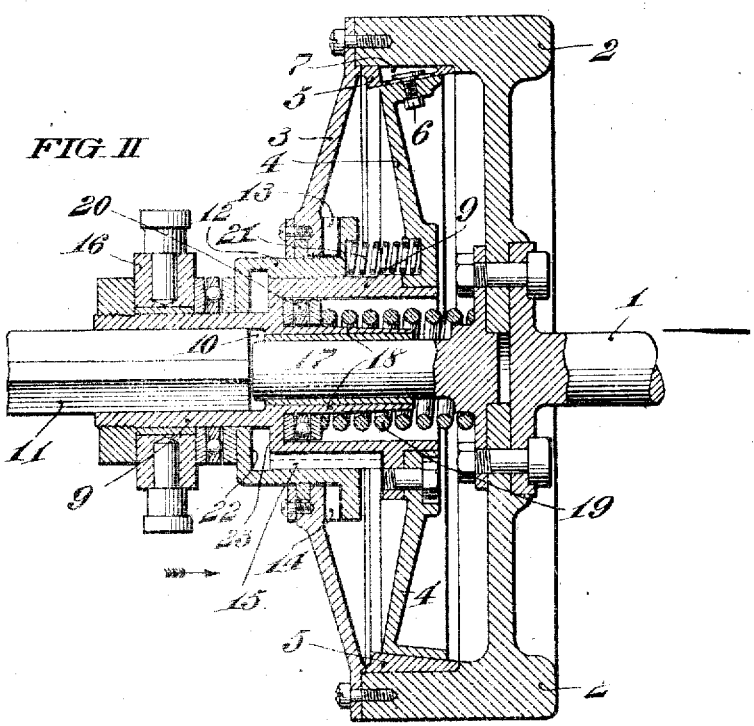
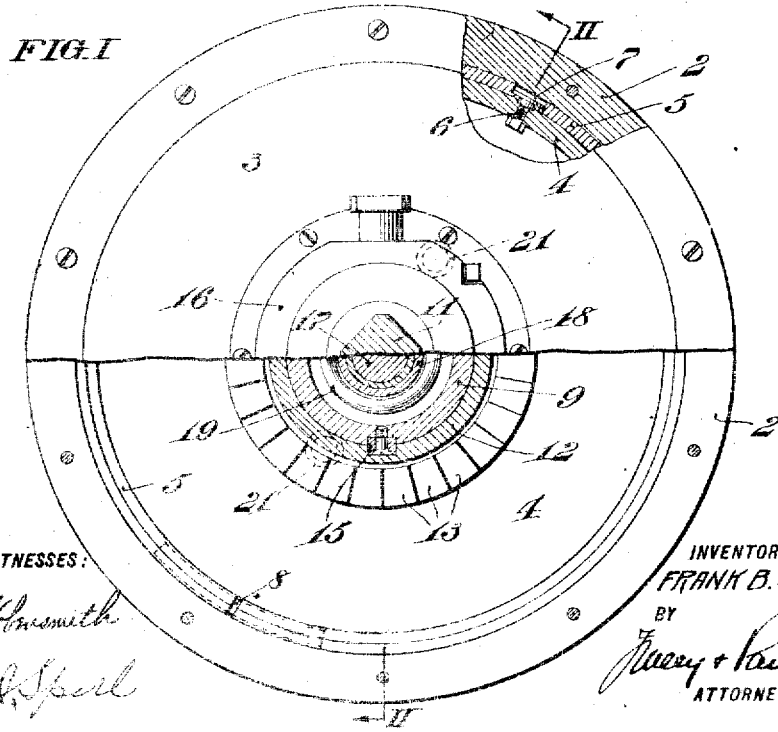

UNITED STATES PATENT OFFICE.

FRANK B. SMITH, OF PHILADELPHIA, PENNSYLVANIA.

INTERLOCKING FRICTION-CLUTCH.

No. 920,203.　　　　Specification of Letters Patent.　　　　Patented May 4, 1909.

Application filed October 26, 1906. Serial No. 340,619.

*To all whom it may concern:*

Be it known that I, FRANK B. SMITH, a citizen of the United States, residing at the Normandie, Thirty-sixth and Chestnut streets, in the city of Philadelphia, county of Philadelphia, and State of Pennsylvania, have invented certain new and useful Improvements in Interlocking Friction-Clutches, whereof the following is a specification, reference being had to the accompanying drawings.

My invention relates to a combined interlocking and friction clutch in which, during the operation of throwing the clutches into engagement the friction clutch is first thrown into engagement and thereafter the toothed clutch thrown into locking engagement, and, upon releasing the clutch, the toothed clutch is first entirely freed before the friction clutch is released.

In the accompanying drawings, I have illustrated a clutch which embodies my invention, and in which:—

Figure I, is a view partly in end elevation and partly in section, and Fig. II, is a sectional view taken on the line II, II, of Fig. I.

In said figures, the shaft 1, for the purpose of description, is assumed to be the driving shaft, although it should be understood that it might equally well be considered the driven shaft. A fly wheel or annulus 2, is secured to the driving shaft 1, by means of bolts passing through a flange on said shaft, or in any other suitable manner. Secured to the inner flat face of the annulus 2, is a toothed disk 3, which, together with said annulus forms a driving member. Within said driving member is a disk 4, which forms part of the driven member. The outer face of the disk 4, is conical and upon the face is movably mounted a split ring 5, forming a friction member and made of bronze or any other suitable material. This ring is held upon the disk 4, by means of a screw or bolt 6. This screw passes through an elongated slot in said ring, and the head of the screw is sunk below the surface of the ring and bears upon the countersunk portion of the ring which surrounds the slot 7, thus allowing the disk 4, to be moved longitudinally and thereby force the split ring outwardly against the inner periphery of the fly wheel or annulus 2, whereby the friction members of the clutch become engaged. The ring 5, is held against substantial longitudinal movement between the disk 3, and a shoulder on the annulus 2, but may be forced radially against the inside of the annulus as the conical face of the disk 4, is moved longitudinally. The two ends of the split ring are kept in alinement by means of a key 8, best shown in Fig. I. Secured to the disk 4, is a sleeve 9, provided with a square hole 10, through a portion of its length, which thus allows the sleeve to slide on the squared portion of the driven shaft 11, without rotation thereon.

Slidably mounted on the sleeve 9, is a collar 12, having teeth 13, capable of engagement with similar teeth 14, on the inner face of the disk 3. The sleeve 9, is provided with a key 15, which fits loosely in the keyway in the collar 12. Rotatably mounted on a bearing on the sleeve 9, is a thrust or shifting collar 16, by means of which the toothed collar 12, and disk 4, are moved to effect the engagement and disengagement of the friction and locking clutches.

Secured to the inner face of the web of the fly wheel or annulus 2, is a short shaft 17, which is in alinement with the driven shaft 11, and forms a bearing for an internal extension or boss 18, of the sleeve 9. Surrounding this short shaft 17, and the boss 18, is a heavy coiled spring 19, extending between the web of the annulus 2, and a thrust bearing 20, placed on the boss 18. This spring tends normally to keep the friction members 4, 5, in engagement with the driving member 2. Situated in depressions in the toothed collar 13, and in similar depressions in the opposing face of the disk 4, and extending between said collar and disk are coiled springs 21, two being shown in this case. These springs are weaker than spring 19, and tend normally to keep the collar 12, and toothed disk 3, in locked engagement. The distance between the inner web 22, of the toothed collar 12, and the opposing face 23, of the sleeve 9, is slightly greater than the locking depth of the teeth 13, 14, in order to allow these teeth to be fully unlocked before the friction clutch is moved to effect disengagement between the ring 5, and fly wheel 2.

The operation is as follows:—As shown in the drawings, the clutches are in engagement. To effect disengagement, the collar 16, is forced in the direction indicated by the arrow in Fig. II, thereby moving the toothed collar 12, longitudinally against the thrust of the coiled springs 21, 21, and since these springs are weaker than spring 19, they will compress first and allow the locking teeth 13, 14, to become disengaged. The further movement of the collar 16, in the same direction, forces the face 22, of the collar 12, against the face 23, of the sleeve 9, and afterward these parts move together to overcome the resistance of the spring 19, and thereby force the disk 4, to slide in the same direction and release the friction ring 5, from the annulus 2, whereupon, the parts constituting the driving members are free to rotate and those constituting the driven member remain stationary. To effect the engagement of the clutch the collar 16, is moved in the direction opposite to that indicated in the drawing whereby the friction clutch is first fully engaged and then the locking clutch is engaged.

I claim:—

1. A clutch comprising an annulus; a toothed disk secured to said annulus; a friction member opposed to the inner periphery of said annulus; a sleeve slidably mounted on a shaft and secured to said friction member; a toothed collar slidably mounted about said sleeve and capable of engagement with said toothed disk; means for forcing said friction member and annulus into engagement; and means for forcing said toothed sleeve and disk into locking engagement.

2. A clutch comprising an annulus; a toothed disk secured to said annulus; a friction member opposed to the inner periphery of said annulus; a sleeve slidably mounted on a shaft and secured to said friction member; a toothed collar slidably mounted about said sleeve and capable of engagement with said toothed disk; means for forcing said friction member and annulus into engagement; means for forcing said toothed sleeve and disk into locking engagement; and means for disengaging said friction members and said toothed members.

3. A clutch comprising an annulus secured to a shaft; a toothed disk secured to said annulus; a friction member within said annulus; a sleeve slidably mounted on a shaft; and secured to said friction member; means interposed between said annulus and sleeve tending normally to keep said annulus and friction member in engagement; a toothed collar slidably mounted on said sleeve and capable of locking engagement with said toothed disk; and means interposed between said sleeve and collar tending normally to keep said collar and toothed disk in locking engagement.

4. A clutch comprising an annulus secured to a shaft; a toothed disk secured to said annulus; a friction member within said annulus; a sleeve slidably mounted on a shaft; and secured to said friction member; means interposed between said annulus and sleeve tending normally to keep said annulus and friction member in engagement; a toothed collar slidably mounted on said sleeve and capable of locking engagement with said toothed disk; means interposed between said sleeve and collar tending normally to keep said collar and toothed disk in locking engagement; and means for disengaging said friction members and said locking members.

5. A clutch comprising an annulus secured to a shaft; a toothed disk secured to said annulus; a friction member within said annulus; a sleeve slidably mounted on a shaft and secured to said friction member; a spring interposed between said annulus and sleeve tending normally to keep said annulus and friction member in engagement; a toothed collar slidably mounted on said sleeve and capable of locking engagement with said toothed disk; and a spring interposed between said sleeve and collar tending normally to keep said collar and toothed disk in locking engagement.

In testimony whereof, I have hereunto signed my name, at Philadelphia, Pennsylvania, this twenty-second day of October, 1906.

FRANK B. SMITH.

Witnesses:
JAMES H. BELL,
E. L. FULLERTON.